May 14, 1946. M. E. HAINE 2,400,113
CIRCUIT USED IN GENERATING ELECTRIC IMPULSES
Filed Dec. 18, 1943

MICHAEL EDWARD HAINE
By
ATTORNEYS

Patented May 14, 1946

2,400,113

UNITED STATES PATENT OFFICE 2,400,113

CIRCUITS USED IN GENERATING ELECTRIC IMPULSES

Michael Edward Haine, Sale, England, assignor to Metropolitan-Vickers Electrical Company, Limited, London, England, a company of Great Britain Application December 18, 1943, Serial No. 514,867
In Great Britain July 11, 1942

3 Claims. (Cl. 320—1)

This invention relates to the generation of regularly recurring electric impulses by means of a circuit comprising capacity or capacitive network adapted to be charged through an inductance of relatively high value to limit the slowly rising charging current from a steady source of direct current potential, with means whereby said capacity may be suddenly discharged at a recurrence frequency determined by the application of tripping pulses at regular intervals to said means, which latter is a trippable discharge device such as a "Thyratron" (a registered trademark) or a trigger spark gap which is preferably in accordance with copending United States application Serial No. 514,863, filed December 18, 1943. As will hereinafter appear, the discharging means may be used merely to dissipate the condenser charge, so that the voltage wave form across the condenser can be utilised such as for time bases in cathode ray tubes.

In a circuit as above specified as heretofore proposed and used, the value of the charging inductance has been chosen such as to resonate with the total capacitive network at half the predetermined or required recurrence or tripping frequency. The capacity or capacitive network becomes charged to a voltage twice that of the direct current source.

Whilst the circuit as above specified has proved satisfactory at any one recurrence frequency, it suffers from the disadvantage that in cases where it may be required to vary the recurrence frequency, particularly if the frequency variation is required to be over a considerable range, it is necessary to alter or change the charging circuit component values. This is very difficult and inconvenient to achieve, particularly when the charging circuit is operatively "locked" to the external source of tripping frequency. Whilst such adjustment is not impossible to achieve it might necessitate the use of a cathode ray oscillograph whereby to ensure that the charging circuit is accurately tuned in accordance with incoming tripping frequency.

It has been heretofore proposed for the purpose of removing the disadvantage just above mentioned to introduce a rectifier in series between the direct current charging source and the charging inductance, the latter being of fixed value. With this arrangement the condenser becomes charged approximately according to a sinusoidal wave form to double the voltage of the direct current supply in a time $\pi\sqrt{LC}$ (where L and C are the values of inductance and capacity) and thereafter the voltage remains constant at this value: with this arrangement it is necessary to use an inductance smaller in value than is required for resonance at the recurrent tripping frequency. This arrangement has the obvious disadvantage that the voltage rises more rapidly (than in the case of resonant charging) immediately after the discharge of the condenser on tripping, and this more rapid voltage rise may tend to impair the performance of the discharge device such as a triggered spark gap in accordance with the aforesaid copending application, whilst the introduction of the high voltage rectifier, with the necessarily fully insulated cathode transformer therefor and so on, is expensive and generally undesirable.

In the arrangement involving the addition of the rectifier described in the preceding paragraph, the tripping may take place at any time after the charging condenser voltage has arisen to the maximum value of twice that of the direct current charging supply, whereas in the absence of the rectifier and of tripping, the condenser will discharge, during a time $\pi\sqrt{LC}$ back into the direct current supply, the cycle being then repeated sinusoidally but with energy loss until the voltage across the capacity is the same as that of the direct current supply, and it is for this reason that the resonance frequency of the charging circuit must be chosen such that, in relation to the external tripping circuit (which per se forms no part of the present invention), tripping must take place each time the condenser voltage reaches the voltage maximum, namely, twice the value of the direct current supply. In this connection it will be appreciated that if the time $\pi\sqrt{LC}$ is less than the periodic time of the tripping or recurrence frequency the voltage on the condenser will rise to a higher value than twice the voltage of the direct current supply; as will hereinafter appear, this is undesirable since it may in itself bring about the premature tripping of the circuit independently of the external tripping circuit.

The present invention, which has been proved both experimentally and mathematically, removes the aforesaid disadvantages of the circuits heretofore proposed and consists in the choice of a value for the charging inductance greater than corresponds to the lowest recurrence frequency in a system wherein provision is or can be made for varying the recurrent frequency either by simple adjustment of a component in the external recurrence frequency determining circuit or by the substitution of one such circuit for another whereby the recurrence frequency is changed. Thus a charging inductance value may be chosen which corresponds to a recurrence frequency of, say, six hundred per second and yet the system will operate fully satisfactorily at any recurrent frequency above six hundred and up to, say, fifteen hundred. In fact, as the recurrence frequency is increased the condenser charge wave form approaches more and more a straight line, and it becomes substantially a straight line when the inductance value is large in relation to the resonant value at the operating frequency. The condenser voltage reaches twice the charging voltage and no more for steady operation, irrespective of the recurrence frequency being above the minimum for any fixed value of inductance. In other words, the system will operate satisfactorily at any frequency corresponding to or above the resonant value of the inductance in relation to the circuit capacitance.

Furthermore, the invention has the advantage that the iron losses in the charging inductance at the higher frequencies are reduced in relation to the case where resonance is always maintained since the alternating component of current in the inductance is reduced.

As hereinbefore indicated and as will hereinafter more fully appear, the invention is also applicable to the provision of "time base" voltages of the saw-tooth type with a rapid "flyback" such as may be produced by means of a "Thyratron" or other thermionic valve circuit. Thus there may be connected across the charging condenser an appropriately biased "Thyratron," to the grid of which the recurrent frequency voltage is applied from the external means at the regular intervals, the condenser being connected to the cathode ray tube to provide the time base. If desired a constant current may be maintained through the inductance in the anode circuit of the "Thyratron" by the provision of a neon lamp or equivalent device shunting the condenser. With this provision the condenser charges to the full voltage and then remains constant until the tripping pulse arises so that the range of the time base is independent of frequency.

To enable the invention to be fully understood it will now be described with reference to the accompanying purely diagrammatic drawings and graphs, in which—

Figure 1:
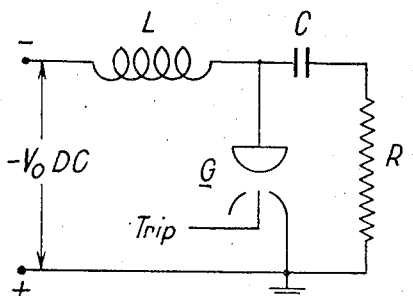
Fig. 1 shows the main elements of the charging and discharging circuit.
Figure 2:
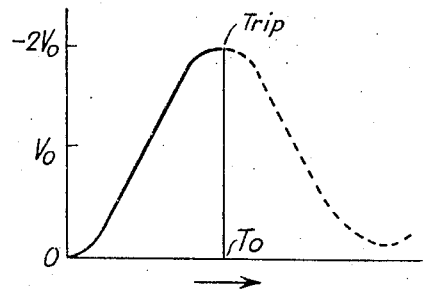
Fig. 2 is a graph indicating the operation of circuit shown in Fig. 1 when the value of the charging inductance is such as to resonate with the capacity at half the recurrence frequency as in the prior art.

In Fig. 1, C is the condenser to be charged and then discharged suddenly through the load R which may be an oscillator valve the output of which is to be pulse-modulated. The condenser C is charged-up through the inductance or choke L, the value of which may be of the order of many henries, from a source (not shown) of negative potential direct current of, say, 8,000 volts. The condenser discharge is effected recurrently by means of the tripping spark gap G, the trip electrode of which is connected to the circuit (not shown) producing the recurrent tripping pulses at regular intervals. As shown by Fig. 2, after each discharge the condenser charges-up sinusoidally to the voltage $-2Vo$, where $Vo$ is the voltage of said direct current supply. In the prior arrangement tripping occurs after a time $To$. In the absence of tripping the voltage wave form on the condenser C would be oscillatory as indicated by the dotted curve.

Figure 3:
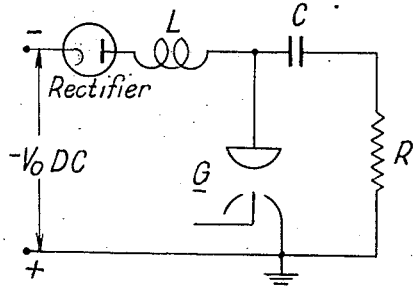
Fig. 3 shows the previously proposed modification hereinbefore referred to, whilst
Figure 4:
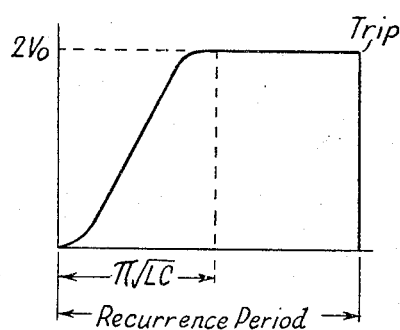
Fig. 4 is a graph indicating the operation of the circuit shown in Fig. 3.

The previously proposed modified arrangement aforesaid where a rectifier is added will be clearly understood from Fig. 3, the charging and discharging wave form being indicated by Fig. 4.

Figure 5:
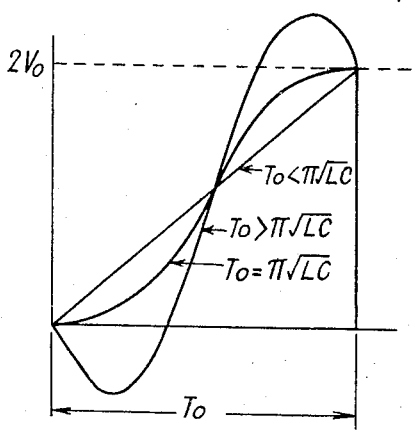
Fig. 5 is a graph illustrating the operation of a circuit as shown in Fig. 1 with different values of the charging inductance.

In Fig. 5 the three curves illustrate respectively the charging of the condenser as in Fig. 2, where $To$ is equal to $\pi\sqrt{LC}$, the charging where $To$ is greater than $\pi\sqrt{LC}$, and the charging where $To$ is less than $\pi\sqrt{LC}$ in accordance with the present invention.

I claim:

1. An electric circuit for generating regularly recurring electric impulses, comprising a capacity in the circuit, means for applying a direct current to the circuit, an inductance connected in the circuit to the negative potential of said current source for charging the capacity, and means connected to the circuit for applying recurrent tripping pulses at regular intervals to the circuit for discharging said capacity, said inductance having a value greater than corresponds to the recurrence frequency applied to the circuit.

2. An electric circuit for generating regularly recurring electric impulses, comprising a capacity in the circuit, means for applying a direct current to the circuit, an inductance connected in said circuit to the negative potential of said current source for charging the capacity, and means connected to the circuit for applying recurrent tripping pulses at regular but variable intervals to the circuit for discharging said capacity, said inductance having a value greater than corresponds to the lowest recurrence frequency applied to the circuit.

3. An electric circuit according to claim 2, wherein said inductance is of a sufficiently high value to charge said condenser to a voltage which reaches but does not exceed twice the charging voltage irrespective of a recurrence frequency above the minimum for any fixed value of said inductance.

MICHAEL EDWARD HAINE.